Oct. 28, 1924.  
E. A. SWIHART  
AUTOMATIC FISHING POLE  
Filed March 12, 1923  
1,513,567  
2 Sheets-Sheet 1

Witnesses:  
Inventor E. A. Swihart  
Attorney

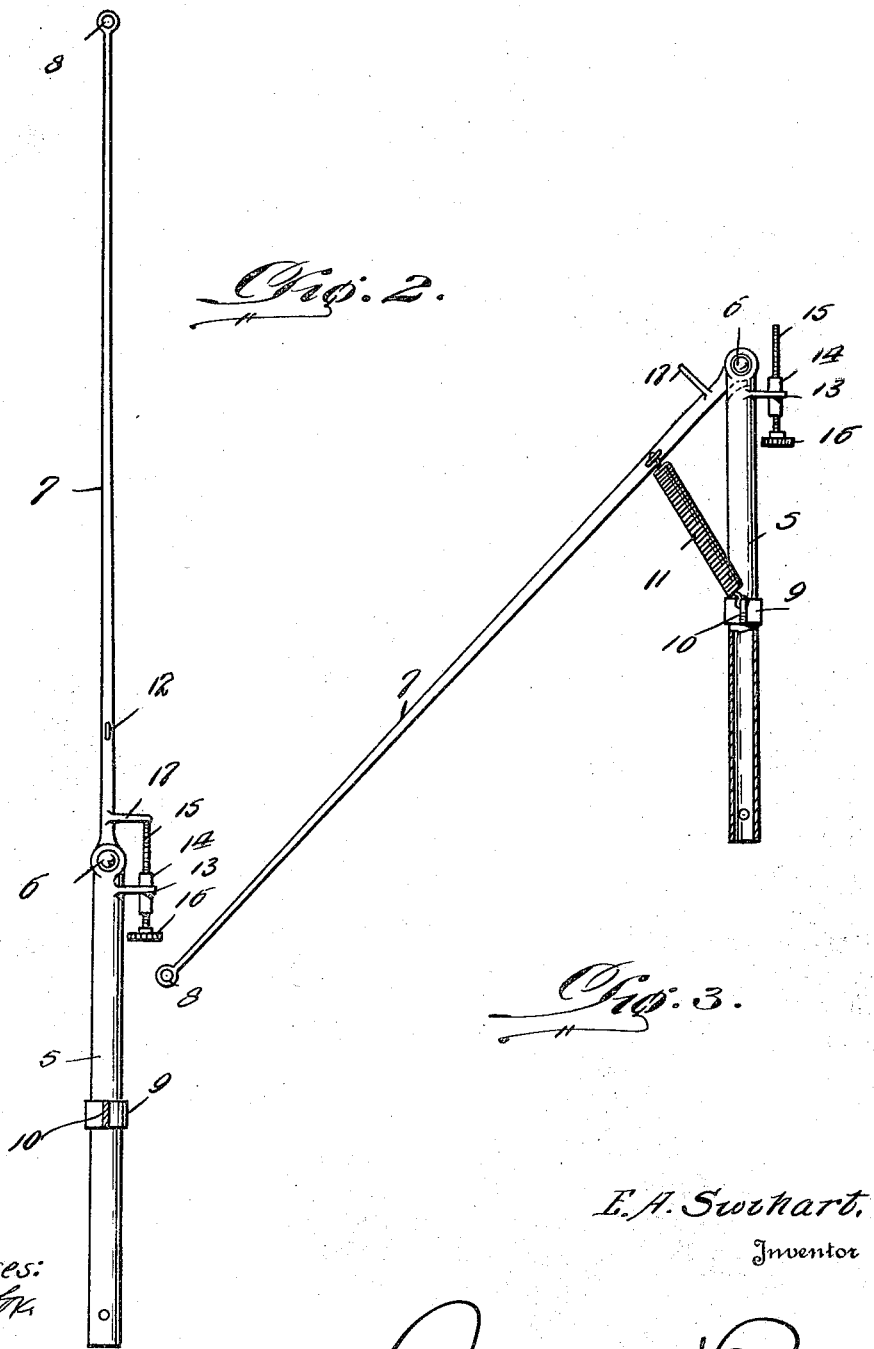

Patented Oct. 28, 1924.

1,513,567

UNITED STATES PATENT OFFICE.

ERAPHIA A. SWIHART, OF TOPEKA, KANSAS.

AUTOMATIC FISHING POLE.

Application filed March 12, 1923. Serial No. 624,397.

*To all whom it may concern:*

Be it known that ERAPHIA A. SWIHART, a citizen of the United States, residing at Topeka, in the county of Shawnee and State of Kansas, has invented certain new and useful Improvements in Automatic Fishing Poles, of which the following is a specification.

My invention relates to improvements in fishing poles, the primary object residing in the provision of such a pole which is automatic in its operation, the nature of the same being such as not to require the attention of the fisherman but it being well adapted for automatically snagging the fish whenever a pull is occasioned upon the line.

A further object of my invention is the provision of such a fishing pole which is comparatively simple in construction and positive in its operation, the pole including relatively few parts and these so correlated as to reduce the liability of derangement to a minimum.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:

Figure 2 is a side elevational view thereof, the control springs therefor being removed;

Figure 3 is a side elevational view of the pole partly in cross section, the same being shown as having been actuated.

Figures 1, 4:
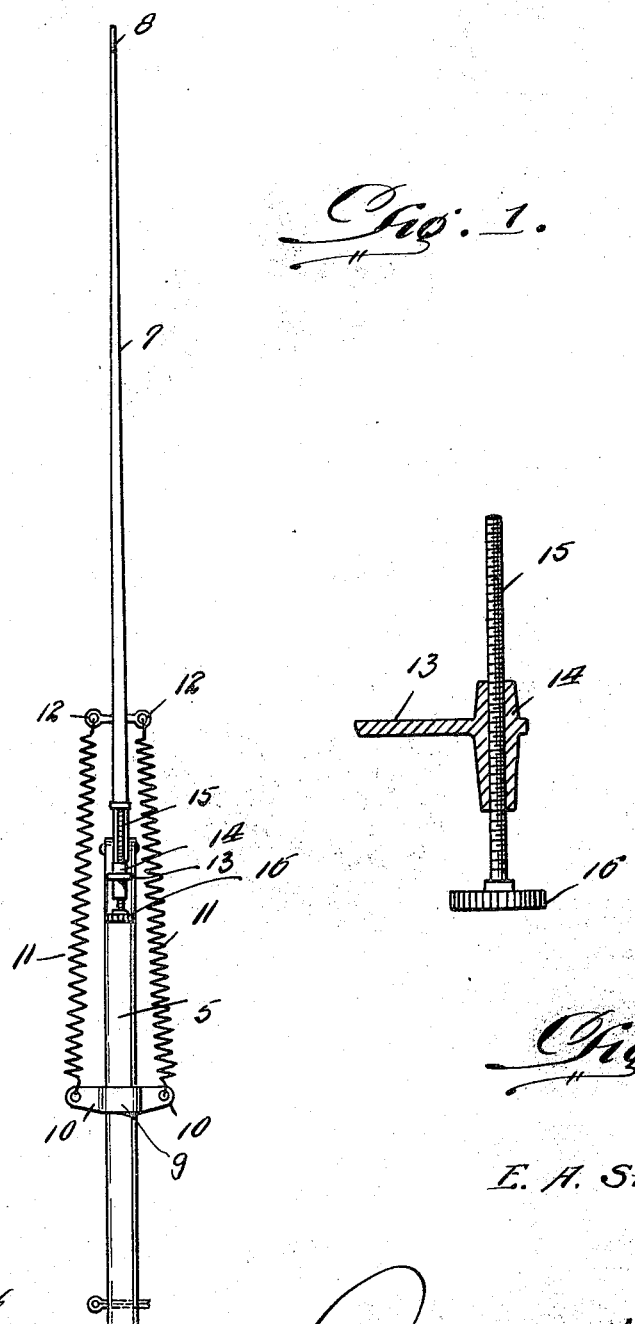
Figure 1 is a rear elevational view of a fishing pole constructed in accordance with my invention.
Figure 4 is a detail enlarged sectional view of a portion of the pole, showing more clearly an adjusting means forming a component part of the invention.

Referring to the drawings in detail, the same includes a hollow rod 5 of desired length, the upper end of the same being split and having pivotally secured thereto as at 6 the lower end of a rod 7, this rod 7 being of a flexible nature and formed at its upper end with a line receiving eye 8.

Surrounding the said hollow rod 5 at any desired point thereon is a collar 9, the same being formed with diametrically opposed lugs or ears 10 and secured at one end to these lugs are coil springs 11, the opposite ends of these springs being in turn secured as at 12 to the said flexible rod 7 and at a point adjacent the pivotal end thereof.

Formed upon the said hollow rod 5 and directly beneath its split end is a forwardly extending arm 13, the outer ends of this arm being in turn formed with a vertical integral screw-threaded sleeve 14. Screw-threaded within this sleeve is a relatively elongated screw-threaded rod 15, the lower end of which is formed with a thumb nut 16. In alinement with the said arm 13 upon the hollow rod 5 is a forwardly projecting arm 17 upon the flexible rod 7, this arm being also adjacent the bottom end of the rod 7 and adapted for contact with the upper end of said screw-threaded rod 15 for controlling the forward pivotal movement of the flexible rod 7 upon the pivot 6.

In view of the above description it will at once be apparent that when the flexible rod 7 is swung upwardly into a position shown in Figure 1 the tension of the springs 11 will be effectively overcome. Whenever a fish pulls upon the line which is attached to the upper end of the flexible rod 7 this rod will be flexed slightly forwardly and upon a reversal of this flexing movement the said rod will be swung rearwardly a slight degree upon the pivot for consequently throwing the springs off center whereby the same will extend the rod 7 into a position clearly shown in Figure 3, this movement effectively snagging the fish and indicating to the fisherman that his attention is needed at this particular line.

It will, of course, be noted that the position of the rod 7 with respect to the rod 5 may be adjusted through the instrumentality of the adjusting rod 15 for requiring a more or less pull upon the rod 7 for different size fish.

Although I have herein shown and described the preferred embodiment of the present invention, it is nevertheless to be understood that minor changes may be made therein, without departing from the spirit and scope of the invention as claimed.

Having thus described my invention, what I claim as new and desire to secure by Letters Patent is:

A fishing pole of the class described including a base, a flexible rod pivoted to said base adapted for positioning slightly forward of alignment therewith, means carried by the base for determining the forward position thereof, and resilient means connected to the rod and the base in line with the pivot when the base and rod are in alignment for moving said rod rearwardly about the pivot and holding it in its forward position, whereby a forward flexing of the rod will be followed by a subsequent rearward flexing and movement thereof about the pivot for moving the line of pull of the resilient means to the rear of the pivot.

In testimony whereof I affix my signature.

ERAPHIA A. SWIHART.